(12) United States Patent
Onishi et al.

(10) Patent No.: US 8,111,041 B2
(45) Date of Patent: Feb. 7, 2012

(54) POWER TRANSMISSION CONTROL DEVICE, POWER RECEPTION CONTROL DEVICE, NON-CONTACT POWER TRANSMISSION SYSTEM, POWER TRANSMISSION DEVICE, POWER RECEPTION DEVICE, AND ELECTRONIC INSTRUMENT

(75) Inventors: Kota Onishi, Nagoya (JP); Kentaro Yoda, Chino (JP); Haruhiko Sogabe, Chino (JP); Takahiro Kamijo, Fujimi (JP); Kuniharu Suzuki, Tokyo (JP); Hiroshi Kato, Yokohama (JP); Katsuya Suzuki, Takasaki (JP); Manabu Yamazaki, Hiratsuka (JP)

(73) Assignees: Seiko Epson Corporation, Tokyo (JP); Sony Ericsson Mobile Communications Japan, Inc., Tokyo (JP)

( * ) Notice: Subject to any disclaimer, the term of this patent is extended or adjusted under 35 U.S.C. 154(b) by 1027 days.

(21) Appl. No.: 12/071,141

(22) Filed: Feb. 15, 2008

(65) Prior Publication Data

US 2008/0197802 A1   Aug. 21, 2008

(30) Foreign Application Priority Data

Feb. 16, 2007   (JP) ................... 2007-036746

(51) Int. Cl.
*H02J 7/00* (2006.01)
*H04B 1/00* (2006.01)
*H04B 7/00* (2006.01)
*H04M 7/00* (2006.01)
*H02H 3/00* (2006.01)

(52) U.S. Cl. ........ 320/108; 320/106; 320/109; 320/115; 320/139; 455/69; 455/88; 455/411; 455/437; 379/55.1; 379/86; 379/443; 361/82

(58) Field of Classification Search ................. 320/106, 320/108
See application file for complete search history.

(56) References Cited

U.S. PATENT DOCUMENTS

| | | | | |
|---|---|---|---|---|
| 5,455,466 A | * | 10/1995 | Parks et al. | 307/104 |
| 5,949,155 A | | 9/1999 | Tamura et al. | |
| 5,991,170 A | * | 11/1999 | Nagai et al. | 363/20 |
| 6,016,046 A | * | 1/2000 | Kaite et al. | 320/108 |
| 6,124,700 A | * | 9/2000 | Nagai et al. | 320/132 |
| 6,208,115 B1 | | 3/2001 | Binder | |
| 7,109,682 B2 | * | 9/2006 | Takagi et al. | 320/108 |

(Continued)

FOREIGN PATENT DOCUMENTS

JP   A-10-12467   1/1998

(Continued)

OTHER PUBLICATIONS

U.S. Appl. No. 12/007,671, filed Jan. 14, 2008 in the name of Kota Onishi et al.

(Continued)

*Primary Examiner* — Yalkew Fantu
(74) *Attorney, Agent, or Firm* — Oliff & Berridge, PLC

(57) ABSTRACT

A power reception device transmits authentication information (e.g., start code, manufacturer ID, product ID, rated power information, and resonance characteristic information) to a power transmission device before starting normal power transmission by a non-contact power transmission system. The power transmission device performs instrument authentication based on the received authentication information, and regulates the maximum transmission power is regulated to conform to a power-reception-device side rated power. The power transmission device then performs normal power transmission.

12 Claims, 9 Drawing Sheets

U.S. PATENT DOCUMENTS

2002/0089305 A1* 7/2002 Park et al. .................... 320/108
2005/0116683 A1* 6/2005 Cheng et al. ................. 320/108

FOREIGN PATENT DOCUMENTS

| JP | A-2005-210801 | 8/2005 |
| JP | A-2006-60909 | 3/2006 |
| JP | A-2006-230032 | 8/2006 |

OTHER PUBLICATIONS

U.S. Appl. No. 12/007,672, filed Jan. 14, 2008 in the name of Kota Onishi et al.

New U.S. Patent Application filed Feb. 15, 2008 in the name of Kota Onishi et al.

* cited by examiner

POWER TRANSMISSION CONTROL DEVICE, POWER RECEPTION CONTROL DEVICE, NON-CONTACT POWER TRANSMISSION SYSTEM, POWER TRANSMISSION DEVICE, POWER RECEPTION DEVICE, AND ELECTRONIC INSTRUMENT

Japanese Patent Application No. 2007-36746 filed on Feb. 16, 2007, is hereby incorporated by reference in its entirety.

BACKGROUND OF THE INVENTION

The present invention relates to a power transmission control device, a power reception control device, a non-contact power transmission system, a power transmission device, a power reception device, an electronic instrument, and the like.

In recent years, non-contact power transmission (contactless power transmission) which utilizes electromagnetic induction to enable power transmission without metal-to-metal contact has attracted attention. As application examples of non-contact power transmission, charging a portable telephone, a household appliance (e.g., telephone handset), and the like has been proposed. JP-A-2006-60909 discloses a non-contact power transmission device using a primary coil and a secondary coil, for example.

In a related-art non-contact power transmission system, a power reception device corresponding to given load conditions is provided. A power transmission device which can transmit power to the power reception device under optimum conditions is necessary. The power transmission device are adjusted in terms of the drive frequency and the impedance of a power transmission section so that best power transmission characteristics are obtained when combined with the power reception device.

A power transmission device or a power reception device of which the power transmission or reception characteristics can be adjusted has also been known.

If the characteristics of a power transmission device and a power reception device are changed when the load of the power reception device is changed, the development period increases when designing different types of non-contact power transmission devices corresponding to the load. In JP-A-10-12467, a power regulation section is provided in a power reception device so that the characteristics of the power reception device can be adjusted to reduce the development period.

In JP-A-2005-210801, a plurality of small power supply coils are provided in a power transmission device. The number of small power supply coils used is adaptively changed corresponding to a change in load so that it is possible to deal with the load which changes in a wide range.

The non-contact power transmission system is expected to be widely used in various fields. In order to deal with such a demand, a power transmission device which can flexibly deal with various power-reception-device-side instruments is necessary.

For example, when utilizing the non-contact power transmission system for charging a secondary battery (load), an instrument provided with the secondary battery may be a portable terminal such as a portable telephone terminal, a PDA terminal, or a portable computer terminal. The non-contact power transmission system may also be used to charge a secondary battery provided in a digital camera, a wristwatch, or the like.

In a related-art non-contact power transmission system, it is impossible to deal with various instruments using a single power transmission device.

In a related-art non-contact power transmission system, when dealing with completely different power-reception-device-side instruments using a single power transmission device, for example, since the rated power of the power-reception-device-side instrument is unknown, optimum transmission power cannot be specified. Therefore, the power transmission device may transmit excessive power to the power reception device.

Moreover, the adjustment range of the power transmission characteristics of a related-art power transmission device is limited. This makes it difficult to deal with a wide variety of instruments as described above.

SUMMARY

According to one aspect of the invention, there is provided a power transmission control device provided in a power transmission device of a non-contact power transmission system, the non-contact power transmission system transmitting power from the power transmission device to a power reception device by electromagnetically coupling a primary coil and a secondary coil to transmit the power to a load of the power reception device, the power transmission control device comprising:

a power-transmission-side control circuit that controls the power transmission device, the power-transmission-side control circuit performing an authentication process based on authentication information that is transmitted from the power reception device to determine whether or not power transmission can be performed before normal power transmission is started, the power-transmission-side control circuit performing control of the normal power transmission when the power-transmission-side control circuit has determined that power transmission can be performed, and controlling maximum transmission power during the normal power transmission to conform to a rated power of power-reception-device-side based on at least part of the authentication information.

According to another aspect of the invention, there is provided a power reception control device provided in a power reception device of a non-contact power transmission system, the non-contact power transmission system transmitting power from a power transmission device to the power reception device by electromagnetically coupling a primary coil and a secondary coil to transmit the power to a load of the power reception device, the power reception control device comprising:

a load modulation section that is used to transmit a signal to the power transmission device; and a power-reception-side control circuit that controls the power reception device, the power-reception-side control circuit performing control of transmitting authentication information to the power transmission device by load modulation by controlling an operation of the load modulation section during authentication before normal power transmission is started, the authentication information including information that allows the power reception device to control transmission power during the normal power transmission.

According to another aspect of the invention, there is provided a non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power reception control device including:

a load modulation section that is used to transmit a signal to the power transmission device; and a power-reception-side control circuit that controls the power reception device;

the power-reception-side control circuit performing control of transmitting authentication information to the power transmission device by load modulation by controlling an operation of the load modulation section during authentication before normal power transmission is started, the authentication information including information that allows the power reception device to control transmission power during the normal power transmission;

a power-transmission-side control circuit of the power transmission device performing an authentication process based the authentication information that is transmitted from the power reception device to determine whether or not power transmission can be performed before the normal power transmission is started, the power-transmission-side control circuit performing control of the normal power transmission when the power-transmission-side control circuit has determined that power transmission can be performed, and controlling maximum transmission power during the normal power transmission to conform to a rated power of a power-reception-device-side based on the information that is included in the authentication information and allows the power transmission device to control transmission power during the normal power transmission.

According to another aspect of the invention, there is provided a power transmission device comprising:

the above power transmission control device;

a power transmission driver that drives a primary coil;

a drive clock signal generation circuit that generates a drive clock signal; and a driver control circuit that controls the power transmission driver based on the drive clock signal.

According to another aspect of the invention, there is provided a power reception device comprising:

the above power reception control device; and a power reception section that converts an induced voltage in a secondary coil into a direct voltage.

According to another aspect of the invention, there is provided an electronic instrument comprising the above power transmission device.

According to another aspect of the invention, there is provided an electronic instrument comprising:

the above power reception device; and a load, power being supplied to the load from the power reception device.

BRIEF DESCRIPTION OF THE SEVERAL VIEWS OF THE DRAWING

FIG. 1A is an oblique view showing a state in which a portable telephone as a power reception device is placed on a charger (cradle) as a power transmission device, and FIG. 1B is a cross-sectional view showing the main portion of electronic instruments which is illustrative of the principle of power transmission from a power transmission device to a power reception device.

FIG. 3A is a waveform diagram showing a frequency-modulated wave for information transmission from a primary-side instrument to a secondary-side instrument, and FIG. 3B is a waveform diagram showing a change of the voltage at the end of a primary coil accompanying load modulation for information transmission from a secondary-side instrument to a primary-side instrument.

FIG. 4A is a view showing a state in which the maximum transmission power is regulated based on authentication information, and FIGS. 4B and 4C are views showing a specific example of authentication information.

FIG. 5A is a view showing a state in which the maximum transmission power is regulated based on authentication information, and FIG. 5B is a view showing a specific example of authentication information.

DETAILED DESCRIPTION OF THE EMBODIMENT

Figure 1A:
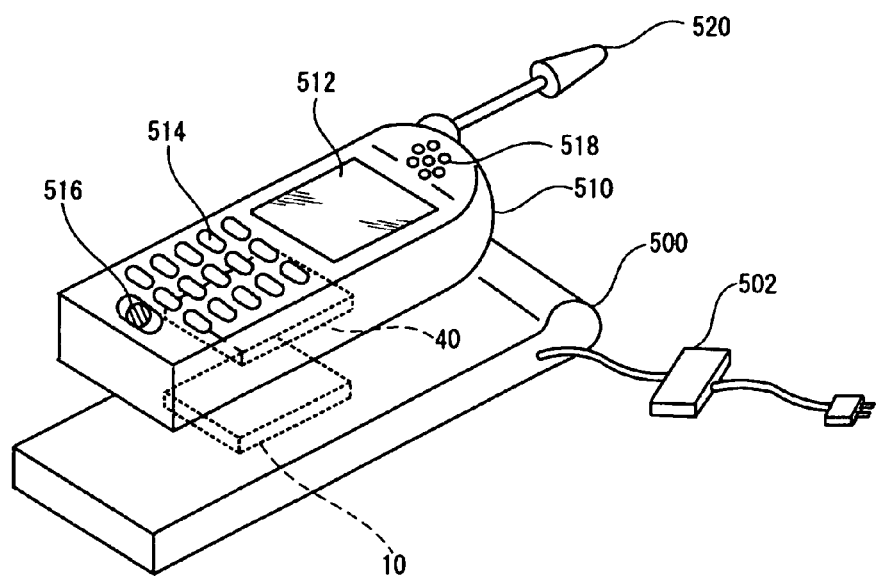
FIGS. 1A and 1B are views showing examples of an electronic instrument utilizing non-contact power transmission.

Some aspects of the invention may enable the power transmission power of a single power transmission device to be flexibly regulated conforming to the rated power of a power-reception-device-side instrument. Moreover, a non-contact power transmission system which can flexibly deal with a wide range of instruments may be implemented, for example.

(1) According to one embodiment of the invention, there is provided a power transmission control device provided in a power transmission device of a non-contact power transmission system, the non-contact power transmission system transmitting power from the power transmission device to a power reception device by electromagnetically coupling a primary coil and a secondary coil to transmit the power to a load of the power reception device, the power transmission control device comprising:

a power-transmission-side control circuit that controls the power transmission device, the power-transmission-side control circuit performing an authentication process based on authentication information that is transmitted from the power reception device to determine whether or not power transmission can be performed before normal power transmission is started, the power-transmission-side control circuit performing control of the normal power transmission when the power-transmission-side control circuit has determined that power transmission can be performed, and controlling maximum transmission power during the normal power transmission to conform to a rated power of power-reception-device-side based on at least part of the authentication information.

Authentication is performed based on the authentication information transmitted from the power reception device before starting normal power transmission. Whether or not the power-reception-device-side instrument is an instrument which may be the power transmission target is determined, and the power-reception-device-side rated power (i.e., rated power of at least one of the power reception device and an instrument provided with the power reception device) is specified based on at least part of the authentication information. The power-transmission-device-side maximum transmission power is adjusted to the power-reception-device-side rated power, and normal power transmission is then performed. The power reception device can acquire the power-reception-device-side information and determine whether or not the power reception device can perform power transmission. This makes it possible to deal with a wide range of instruments. Therefore, it is unnecessary to provide a power transmission device for each power reception device, whereby a primary-side instrument and a secondary-side instrument can be flexibly combined. Since an excessive power is not transmitted to the power-reception-device-side instrument, safety of the power-reception-device-side instrument is ensured. Since an excessive power is not transmitted to the power-reception-device-side instrument, the rating (voltage rating or current rating) of the power-reception-device-side component can be reduced, whereby cost can be reduced. Moreover, since the authentication information is effectively utilized, information used to determine the maximum transmission power need not be transmitted from the power reception device to the power transmission device, whereby the communication process can be simplified.

(2) In the transmission control device, the authentication information may include rated power information of power-reception-device-side, and the power-transmission-side control circuit may control the maximum transmission power during the normal power transmission based on the rated power information of power-reception-device-side.

According to this configuration, the power-reception-device-side rated power information is included in the authentication information. Since the power transmission device can directly acquire the rated power information, the maximum transmission power can be easily regulated.

(3) In the power transmission control device, the authentication information may include information relating to resonance characteristics of a resonant circuit that includes the primary coil as an element.

According to this configuration, the information relating to the resonance characteristics of the resonant circuit is included in the authentication information. The term "information relating to the resonance characteristics" refers to information relating to the resonance frequency used or information relating to the inductance of an LC resonant circuit or the capacitance of a capacitor. The power transmission device can achieve the resonance characteristics of a resonant circuit desired by the power reception device based on the information relating to the resonance characteristics, and perform power transmission under optimum conditions.

(4) In the power transmission control device, the authentication information may include information that specifies a power-reception-device-side instrument.

According to this embodiment, the power-transmission-device-side maximum transmission power is regulated based on the information that is included in the authentication information and specifies the power-reception-device-side instrument. In the embodiment (2) or (3), the information for directly regulating the maximum transmission power is included in the authentication information. On the other hand, this embodiment employs an indirect method which specifies the power-transmission-target instrument, acquires the rated power information relating to the specified instrument referring to a table or the like, and regulates the maximum transmission power. In this embodiment, it is necessary to provide the power transmission device with reference information (e.g., table) in which the power-reception-side instrument is associated with the rated power or the like.

(5) In the power transmission control device,
the power transmission device may further include:
a power transmission driver that drives the primary coil;
a drive clock signal generation circuit that generates a drive clock signal, a frequency of the drive clock signal being variable; and
a driver control circuit that controls the power transmission driver based on the drive clock signal,
the power-transmission-side control circuit may variably change the frequency of the drive clock signal using a frequency control signal to control the maximum transmission power during the normal power transmission.

Specifically, the maximum transmission power is regulated by changing the power transmission frequency. The power transmission frequency may be changed by changing the frequency of the drive clock signal. The frequency of the drive clock signal may be changed by changing s dividing ratio of a drive clock signal generation circuit using a PLL frequency synthesizer.

(6) In the power transmission control device,
the power transmission device may further include:
a power transmission driver that drives the primary coil;
a drive clock signal generation circuit that generates a drive clock signal, a frequency of the drive clock signal being variable; and
a driver control circuit that controls the power transmission driver based on the drive clock signal,
the power-transmission-side control circuit may variably change a voltage value of an output signal from the power transmission driver using a level control signal, the power-transmission-side control circuit controlling the maximum transmission power during the normal power transmission by variably changing the voltage value.

Specifically, the maximum transmission power is regulated by changing the level (i.e., voltage value) of the output signal from the power transmission driver. For example, the voltage amplitude of the drive clock signal may be regulated by controlling the power supply voltage of the drive clock signal generation circuit. Likewise, the amplitude of the output signal from the power transmission driver may be regulated by controlling the power supply voltage of the power transmission driver.

(7) In the transmission control device, the power transmission device may further include a capacitor that forms a resonant circuit together with the primary coil, capacitance of the capacitor being variable; and the power-transmission-side control circuit may adjust the capacitance of the capacitor to control the maximum transmission power during the normal power transmission by using a capacitance adjustment signal.

Specifically, the maximum transmission power is regulated by changing the capacitance of the capacitor which forms the resonant circuit to control the resonance characteristics. The transmission power from the power transmission device varies depending on the resonance characteristics of the LC resonant circuit which includes the primary coil and the capacitor as elements. For example, even if the transmission frequency is maintained at a frequency f1, the difference between the frequency f1 and the resonance frequency (resonance peak) changes when the resonance characteristics (resonance peak) of the resonant circuit change. As a result, the transmission power changes. According to the above configuration, the resonance characteristics can be controlled by variably changing the capacitance of the capacitor (C) of the LC resonant circuit, whereby the maximum transmission power can be regulated to conform to the power-reception-device side rated power.

(8) In the transmission control device, the primary coil may be a coil that has a variable inductance; and the power-transmission-side control circuit may change resonance characteristics of the resonant circuit to control the maximum transmission power during the normal power transmission by adjusting the inductance of the primary coil using an inductance adjustment signal.

Specifically, the maximum transmission power is regulated by controlling the resonance characteristics by changing the inductance of the primary coil which forms the resonant circuit. The transmission power from the power transmission device varies depending on the resonance characteristics of the LC resonant circuit which includes the primary coil and the capacitor as elements. For example, even if the transmission frequency is maintained at a frequency f1, the difference between the frequency f1 and the resonance frequency (resonance peak) changes when the resonance characteristics (resonance peak) of the resonant circuit change. As a result, the transmission power changes. According to the above configuration, the resonance characteristics can be controlled by variably changing the inductance of the primary coil (L1) which forms the LC resonant circuit, whereby the maximum transmission power can be regulated to conform to the power-reception-device side rated power.

(9) In the transmission control device, the power-transmission-side control circuit may change the resonance characteristics of the resonant circuit when receiving a signal that requests power-saving power transmission from the power reception device, at the power-saving power transmission, the power transmission device transmitting the power smaller than the power at the normal power transmission, and the power-transmission-side control circuit may perform control of the power-saving power transmission at the same frequency as a frequency during the normal power transmission.

Specifically, the function of controlling the transmission power without changing the power transmission frequency is applied to power-saving power transmission. The term "power-saving power transmission" refers to continuous power transmission which transmits a small amount of power as compared with normal power transmission. For example, when power transmission from the power transmission device is completely stopped after the load (secondary battery) of the power reception device has been completed, it may be impossible to recharge the load (secondary battery). Specifically, when the portable instrument or the like is continuously placed on the charger, for example, the load (secondary battery) which has been fully charged is discharged and requires recharging with the passage of time. In this case, it is necessary to recharge the load (secondary battery). On the other hand, when normal power transmission is stopped when the load (secondary battery) has been fully charged, the power reception device cannot detect that recharging is necessary. Therefore, it is desirable to perform continuous power transmission (i.e., power-saving power transmission) which transmits a small amount of power after the load (secondary battery) has been fully charged to maintain the charge control function of the load (secondary battery) of the power reception device in an ON state, detect whether or not recharging is necessary, and immediately resume normal power transmission when recharging is necessary. However, if the transmission frequency is changed to implement power-saving power transmission, for example, peripheral instruments may be affected by a change in frequency (e.g., a change in transmission frequency may cause a problem relating to the Radio Law). Therefore, the frequency difference between the resonance frequency (resonance peak) and the transmission frequency is increased by variably changing the inductance L and capacitance C of the LC resonant circuit while maintaining the same frequency as the frequency during normal power transmission, whereby the transmission power can be reduced. This enables power transmission to be changed to power-saving power transmission without changing the transmission frequency. Since the transmission frequency is constant, a problem relating to the Radio Law does not occur.

(10) According to another embodiment of the invention, there is provided a power reception control device provided in a power reception device of a non-contact power transmission system, the non-contact power transmission system transmitting power from a power transmission device to the power reception device by electromagnetically coupling a primary coil and a secondary coil to transmit the power to a load of the power reception device, the power reception control device comprising:

a load modulation section that is used to transmit a signal to the power transmission device; and a power-reception-side control circuit that controls the power reception device, the power-reception-side control circuit performing control of transmitting authentication information to the power transmission device by load modulation by controlling an operation of the load modulation section during authentication before normal power transmission is started, the authentication information including information that allows the power reception device to control transmission power during the normal power transmission.

The power reception control device has a function of transmitting the authentication information to the power transmission device by load modulation during authentication before normal power transmission. When the load of the power reception device increases and decreases, the voltage at the end of the primary coil increases and decreases correspondingly. Therefore, the power transmission device can receive the authentication information transmitted from the power reception device by monitoring the voltage at the end of the primary coil.

(11) In the power reception control device, the power-reception-side control circuit may monitor a state of the load during the normal power transmission, and may perform control of transmitting a signal that requests power-saving power transmission to the power transmission device when the load does not require power transmission during the normal power transmission, at the power-saving power transmission, the power transmission device transmitting the power smaller than the power at the normal power transmission.

The power reception control device has a function of monitoring the state of the load to detect whether or not a change to power-saving power transmission is necessary and transmitting a signal that requests power-saving power transmission to the power transmission device.

(12) According to another embodiment of the invention, there is provided a non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power reception control device including:

a load modulation section that is used to transmit a signal to the power transmission device; and a power-reception-side control circuit that controls the power reception device;

the power-reception-side control circuit performing control of transmitting authentication information to the power transmission device by load modulation by controlling an operation of the load modulation section during authentication before normal power transmission is started, the authentication information including information that allows the power reception device to control transmission power during the normal power transmission;

a power-transmission-side control circuit of the power transmission device performing an authentication process based the authentication information that is transmitted from the power reception device to determine whether or not power transmission can be performed before the normal power transmission is started, the power-transmission-side control circuit performing control of the normal power transmission when the power-transmission-side control circuit has determined that power transmission can be performed, and controlling maximum transmission power during the normal power transmission to conform to a rated power of a power-reception-device-side based on the information that is included in the authentication information and allows the power transmission device to control transmission power during the normal power transmission.

In the non-contact power transmission system according to this embodiment, since the power transmission device authenticates the instrument and regulate the maximum transmission power based on the authentication information from the power reception device, an appropriate power transmission can be performed (i.e., excessive power is not transmitted). Therefore, it is possible to deal with a wide variety of power-transmission-device-side instruments using a single power reception device.

(13) In the non-contact power transmission system, the power-reception-side control circuit may monitor a state of the load during the normal power transmission, and may perform control of transmitting a signal that requests power-saving power transmission when the load does not require the power transmission during the normal power transmission, at the power-saving transmission, the power transmission device transmitting the power smaller than the power at the normal power transmission; and the power-transmission-side control circuit may perform control of changing resonance characteristics of the resonant circuit when receiving the signal that requests the power-saving power transmission from the power reception device, and may perform control of the power-saving power transmission at the same frequency as a frequency during power transmission.

In the non-contact power transmission system according to this embodiment, the power reception device monitors the state of the load and transmits a signal that requests power-saving power transmission to the power transmission device. The power transmission device changes the resonance characteristics of the resonant circuit, and performs power-saving power transmission while maintaining the transmission frequency during normal power transmission. Therefore, since power-saving power transmission (i.e., continuous power transmission which transmits a small amount of power) can be easily implemented while maintaining a constant transmission frequency, a problem relating to the Radio Law does not occur, for example.

(14) According to another embodiment of the invention, there is provided a power transmission device comprising:

one of the above power transmission control devices;

a power transmission driver that drives a primary coil;

a drive clock signal generation circuit that generates a drive clock signal; and a driver control circuit that controls the power transmission driver based on the drive clock signal.

This implements a power transmission device which can deal with a wide variety of electronic instruments.

(15) According to another embodiment of the invention, there is provided a power reception device comprising:

one of the above power reception control devices; and a power reception section that converts an induced voltage in a secondary coil into a direct voltage.

This implements a power reception device which can transmit the authentication information to the power transmission device, and can receive power of which the maximum transmission power has been regulated from the power transmission device and supply the power to the load.

(16) According to another embodiment of the invention, there is provided an electronic instrument comprising the above power transmission device.

This implements a power-transmission-side electronic instrument (e.g., cradle used to charge a portable terminal) which can deal with a wide variety of electronic instruments.

(17) According to another embodiment of the invention, there is provided an electronic instrument comprising:

the above power reception device; and a load, power being supplied to the load from the power reception device.

This implements a power-reception-side electronic instrument which can transmit the authentication information to the power transmission device, and can receive power of which the maximum transmission power has been regulated from the power transmission device and supply the power to the load.

As described above, some embodiments of the invention can enable the power transmission power of a single power transmission device to be flexibly regulated conforming to the rated power of a power-reception-device-side instrument so that it is possible to deal with a wide variety of instruments. According to some embodiments of the invention, various electronic instruments provided with the power reception device can safely utilize a single power-transmission-side electronic instrument. According to some embodiments of the invention, convenience of the non-contact power transmission system is improved to a large extent, for example. Therefore, utilization of the non-contact power transmission system can be promoted. Moreover, the non-contact power transmission system can be widely spread as a social infrastructure.

Preferred embodiments of the invention are described below with reference to the drawings.

Note that the embodiments described below do not in any way limit the scope of the invention defined by the claims laid out herein. Note that all elements of the embodiments described below should not necessarily be taken as essential requirements for the invention.

First Embodiment

Examples of an electronic instrument to which the invention is suitably applied and the principle of non-contact power transmission technology are described below.

Figure 1B:
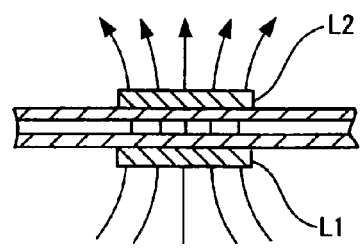

Examples of Electronic Instrument and Principle of Non-Contact Power Transmission FIGS. 1A and 1B are views illustrative the non-contact power transmission technology. FIG. 1A is a view showing examples of an electronic instrument to which the non-contact power transmission technology is applied, and FIG. 1B is a view illustrative of the principle of non-contact power transmission using an induction transformer.

As shown in FIG. 1A, a charger 500 (cradle) (i.e., electronic instrument) includes a power transmission device 10. A portable telephone 510 (i.e., electronic instrument) includes a power reception device 40. The portable telephone 510 also includes a display section 512 such as an LCD, an operation section 514 which includes a button or the like, a microphone 516 (sound input section), a speaker 518 (sound output section), and an antenna 520.

Power is supplied to the charger 500 through an AC adaptor 502. The power supplied to the charger 500 is transmitted from the power transmission device 10 to the power reception device 40 by means of non-contact power transmission. This makes it possible to charge a battery of the portable telephone 510 or operate a device provided in the portable telephone 510.

The electronic instrument to which this embodiment is applied is not limited to the portable telephone 510. For example, this embodiment may be applied to various electronic instruments such as a wristwatch, a cordless telephone, a shaver, an electric toothbrush, a wrist computer, a handy terminal, a portable information terminal, and a power-assisted bicycle.

Examples of a particularly suitable electronic instrument include a portable terminal (including portable telephone terminal, PDA terminal, and portable personal computer terminal) and a watch. Since the power reception device according to the invention has a simple configuration and is small, the power reception device can be provided in a portable terminal or the like. The charging time of a secondary battery provided in an electronic instrument can be reduced using the power reception device according to the invention due to low loss. Moreover, since heat generation is reduced using the power reception device according to the invention, the reliability of an electronic instrument increases from the viewpoint of safety.

In particular, since a large amount of charging current flows through a portable terminal (including portable telephone terminal, PDA terminal, and portable personal computer terminal) under heavy load, heat generation tends to occur to a large extent. Therefore, the features of the invention (i.e., low loss and low heat generation) can be sufficiently utilized for such a portable terminal.

As schematically shown in FIG. 1B, power transmission from the power transmission device 10 to the power reception device 40 is implemented by electromagnetically coupling a primary coil L1 (power-transmission-side coil) provided in the power transmission device 10 and a secondary coil L2 (power-reception-side coil) provided in the power reception device 40 to form a power transmission transformer. This enables non-contact power transmission.

Configuration Examples of Power Transmission Device and Power Reception Device

Figure 2:
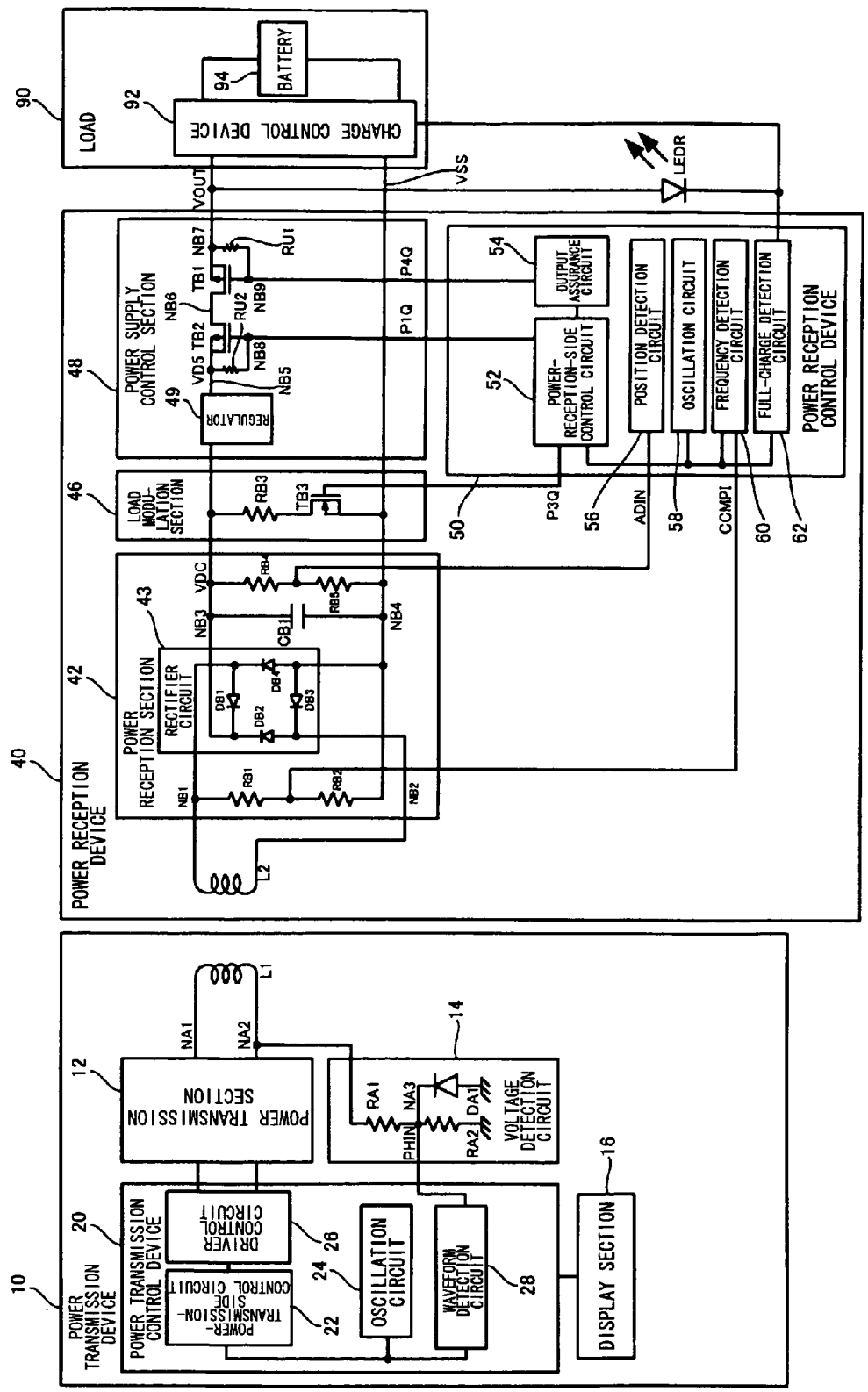
FIG. 2 is a view showing an example of a specific configuration of a power transmission device, a power transmission control device, a power reception device, and a power reception control device according to the invention.

FIG. 2 is a circuit diagram showing an example of a specific configuration of each section of a non-contact power transmission system which includes a power transmission device, a power reception device, and a load. As shown in FIG. 2, a power transmission device 10 includes a power transmission control device 20 and a power transmission section 12. The power reception device 40 includes a power reception section 42, a load modulation section 46, and a power supply control section 48. A load 90 includes a charge control device 92 and a battery (secondary battery) 94. The details are given below.

A power-transmission-side electronic instrument such as the charger 500 shown in FIG. 1A includes at least the power transmission device 10 shown in FIG. 2. A power-reception-side electronic instrument such as the portable telephone 510 includes at least the power reception device 40 and the load 90. The configuration shown in FIG. 2 implements a non-contact power transmission (contactless power transmission) system in which power is transmitted from the power transmission device 10 to the power reception device 40 by electromagnetically coupling the primary coil L1 and the secondary coil L2, and power (voltage VOUT) is supplied to the load 90 from a voltage output node NB7 of the power reception device 40.

The power transmission device 10 (power transmission module or primary module) may include the primary coil L1, a power transmission section 12, a voltage detection circuit 14, a display section 16, and a power transmission control device 20. The power transmission device 10 and the power transmission control device 20 are not limited to the configuration shown in FIG. 2. Various modifications may be made such as omitting some elements (e.g., display section and voltage detection circuit), adding other elements, or changing the connection relationship.

Figure 3A:
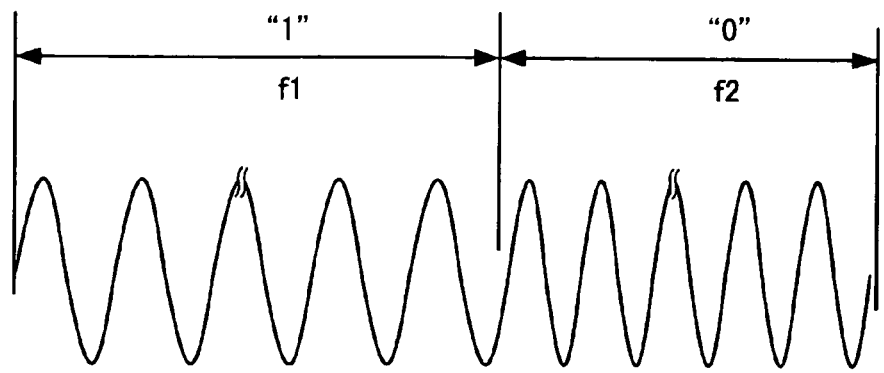
FIGS. 3A and 3B are views illustrative of the principle of information transmission between a primary-side instrument and a secondary-side instrument.

The power transmission section 12 generates an alternating-current voltage at a given frequency during power transmission, and generates an alternating-current voltage at a frequency which differs depending on data during data transfer. The power transmission section 12 supplies the generated alternating-current voltage to the primary coil L1. As shown in FIG. 3A, the power transmission section 12 generates an alternating-current voltage at a frequency f1 when transmitting data "1" to the power reception device 40, and generates an alternating-current voltage at a frequency f2 when transmitting data "0" to the power reception device 40, for example. The power transmission section 12 may include a first power transmission driver which drives one end of the primary coil L1, a second power transmission driver which drives the other end of the primary coil L1, and at least one capacitor which forms a resonant circuit together with the primary coil L1. Each of the first and second power transmission drivers included in the power transmission section 12 is an inverter circuit (or buffer circuit) which includes a power MOS transistor, for example, and is controlled by a driver control circuit 26 of the power transmission control device 20.

The primary coil L1 (power-transmission-side coil) is electromagnetically coupled with the secondary coil L2 (power-reception-side coil) to form a power transmission transformer. For example, when power transmission is necessary, the portable telephone 510 is placed on the charger 500 so that a magnetic flux of the primary coil L1 passes through the secondary coil L2, as shown in FIGS. 1A and 1B.

When power transmission is unnecessary, the charger 500 and the portable telephone 510 are physically separated so that a magnetic flux of the primary coil L1 does not pass through the secondary coil L2.

The voltage detection circuit 14 is a circuit which detects an induced voltage in the primary coil L1. The voltage detection circuit 14 includes resistors RA1 and RA2 and a diode DA1 provided between a connection node NA3 of the resistors RA1 and RA2 and GND (low-potential-side power supply in a broad sense), for example. Specifically, a signal PHIN obtained by dividing the induced voltage in the primary coil L1 using the resistors RA1 and RA2 is input to a waveform detection circuit 28 of the power transmission control device 20.

The display section 16 displays the state (e.g., power transmission or ID authentication) of the non-contact power transmission system using a color, an image, or the like. The display section 16 is implemented by a light-emitting diode (LED), a liquid crystal display (LCD), or the like.

The power transmission control device 20 is a device which controls the power transmission device 10. The power transmission control device 20 may be implemented by an integrated circuit device (IC) or the like. The power transmission control device 20 may include a control circuit 22 (power transmission side), an oscillation circuit 24, a driver control circuit 26, and the waveform detection circuit 28.

The control circuit 22 (control section) controls the power transmission device 10 and the power transmission control device 20. The control circuit 22 may be implemented by a gate array, a microcomputer, or the like. Specifically, the control circuit 22 performs sequence control and a determination process necessary for power transmission, load detection, frequency modulation, foreign object detection, detachment detection, and the like.

The oscillation circuit 24 includes a crystal oscillation circuit, for example. The oscillation circuit 24 generates a primary-side clock signal. The driver control circuit 26 generates a control signal at a desired frequency based on the clock signal generated by the oscillation circuit 24, a frequency setting signal from the control circuit 22, and the like, and outputs the generated control signal to the power transmission drivers (not shown) of the power transmission section 12 to control the operations of the power transmission drivers.

The waveform detection circuit 28 monitors the waveform of the signal PHIN which corresponds to the induced voltage at one end of the primary coil L1, and performs load detection, foreign object detection, and the like. For example, when a load modulation section 46 of the power reception device 40 modulates load in order to transmit data to the power transmission device 10, the signal waveform of the induced voltage in the primary coil L1 changes correspondingly.

Figure 3B:
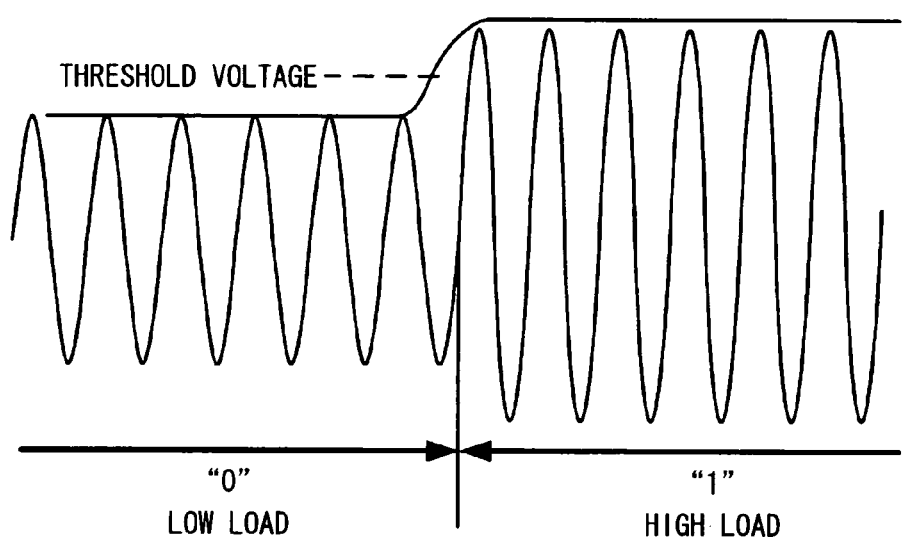

As shown in FIG. 3B, the amplitude (peak voltage) of the signal waveform decreases when the load modulation section 46 of the power reception device 40 reduces load in order to transmit data "0", and the amplitude of the signal waveform increases when the load modulation section 46 increases load in order to transmit data "1". Therefore, the waveform detection circuit 28 can determine whether the data transmitted from the power reception device 40 is "0" or "1" by determining whether or not the peak voltage has exceeded a threshold voltage as a result of a peak-hold process on the signal waveform of the induced voltage, for example. Note that the waveform detection method is not limited to the above-described method. For example, the waveform detection circuit 28 may determine whether the power-reception-side load has increased or decreased using a physical quantity other than the peak voltage.

The power reception device 40 (power reception module or secondary module) may include the secondary coil L2, a power reception section 42, the load modulation section 46, a power supply control section 48, and a power reception control device 50. The power reception device 40 and the power reception control device 50 are not limited to the configuration shown in FIG. 2. Various modifications may be made such as omitting some elements, adding other elements, or changing the connection relationship.

The power reception section 42 converts an alternating-current induced voltage in the secondary coil L2 into a direct-current voltage. A rectifier circuit 43 included in the power reception section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node), the diode DB2 is provided between the node NB3 and a node NB2 at the other end of the secondary coil L2, the diode DB3 is provided between the node NB2 and a node NB4 (VSS), and the diode DB4 is provided between the nodes NB4 and NB1.

Resistors RB1 and RB2 of the power reception section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power reception section 42 are provided between the node NB3 (direct-current voltage VDC) and the node NB4 (VSS). A signal VD4 obtained by dividing the voltage between the nodes NB3 and NB4 using the resistors RB4 and RB5 is input to a power-reception-side control circuit 52 and a position detection circuit 56 through a signal line LP2. The divided voltage VD4 is input to the position detection circuit 56 as a frequency detection signal input (ADIN).

The load modulation section 46 performs a load modulation process. Specifically, when the power reception device 40 transmits desired data to the power transmission device 10, the load modulation section 46 variably changes the load of the load modulation section 46 (secondary side) depending on transmission data to change the signal waveform of the induced voltage in the primary coil L1. The load modulation section 46 includes a resistor RB3 and a transistor TB3 (N-type CMOS transistor) provided in series between the nodes NB3 and NB4.

The transistor TB3 is ON/OFF-controlled based on a control signal P3Q supplied from the power-reception-side control circuit 52 of the power reception control device 50 through a signal line LP3. When performing the load modulation process by ON/OFF-controlling the transistor TB3 and transmitting a signal to the power transmission device in an authentication stage before normal power transmission starts, transistors TB1 and TB2 of the power supply control section 48 are turned OFF so that the load 90 is not electrically connected to the power reception device 40.

For example, when reducing the secondary-side load (high impedance) in order to transmit data "0", the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 becomes the resistance RB3 (high load).

The power supply control section 48 controls power supply to the load 90. A regulator (LDO) 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

A transistor TB2 (P-type CMOS transistor) is provided between a power supply voltage VD5 generation node NB5 (output node of regulator 49) and a transistor TB1 (node NB6), and is controlled based on a signal P1Q from the control circuit 52 of the power reception control device 50. Specifically, the transistor TB2 is turned ON when ID authentication has been completed (established) and normal power transmission is performed.

A pull-up resistor RU2 is provided between the power supply voltage generation node NB5 and a node NB8 of the gate of the transistor TB2.

The transistor TB1 (P-type CMOS transistor) is provided between the transistor TB2 (node NB6) and the voltage VOUT output node NB7, and is controlled based on a signal P4Q from an output assurance circuit 54. Specifically, the transistor TB1 is turned ON when ID authentication has been completed and normal power transmission is performed. The transistor TB1 is turned OFF when connection of an AC adaptor has been detected or the power supply voltage VD5 is lower than the operation lower limit voltage of the power reception control device 50 (control circuit 52), for example. A pull-up resistor RU 1 is provided between the voltage output node NB7 and a node NB9 of the gate of the transistor TB1.

The power reception control device 50 is a device which controls the power reception device 40. The power reception control device 50 may be implemented by an integrated circuit device (IC) or the like. The power reception control device 50 may operate based on the power supply voltage VD5 generated from the induced voltage in the secondary coil L2. The power reception control device 50 may include the control circuit 52 (power reception side), the output assurance circuit 54, the position detection circuit 56, an oscillation circuit 58, the frequency detection circuit 60, and a full-charge detection circuit 62.

The power-reception-side control circuit 52 controls the power reception device 40 and the power reception control device 50. The power reception control circuit 52 may be implemented by a gate array, a microcomputer, or the like. The power-reception-side control circuit 52 operates based on a constant voltage (VD5) at the output terminal of the series regulator (LDO) 49 as a power supply voltage.

The power-reception-side control circuit 52 performs sequence control and a determination process necessary for ID authentication, position detection, frequency detection, full-charge detection, load modulation for authentication communication, load modulation for communication which enables foreign object insertion detection, and the like.

The output assurance circuit 54 is a circuit which assures the output from the power reception device 40 when the voltage is low (0 V). For example, when connection of an AC adaptor has been detected or the power supply voltage VD5 is lower than the operation lower limit voltage, for example, the output assurance circuit 54 causes the transistor TB1 to be turned OFF to prevent a backward current flow from the voltage output node NB7 to the power reception device 40.

The position detection circuit 56 monitors the waveform of the signal ADIN which corresponds to the waveform of the induced voltage in the secondary coil L2, and determines whether or not the positional relationship between the primary coil L1 and the secondary coil L2 is appropriate. Specifically, the position detection circuit 56 converts the signal ADIN into a binary value using a comparator, and determines whether or not the positional relationship between the primary coil L1 and the secondary coil L2 is appropriate.

The oscillation circuit 58 includes a CR oscillation circuit, for example. The oscillation circuit 58 generates a secondary-side clock signal. The frequency detection circuit 60 detects the frequency (f1 or f2) of the signal CCMPI, and determines whether the data transmitted from the power transmission device 10 is "1" or "0".

The full-charge detection circuit 62 (charge detection circuit) is a circuit which detects whether or not a battery 94 of the load 90 has been fully charged (charging has been completed). Specifically, the full-charge detection circuit 62 detects the full-charge state by detecting whether a light-emitting device LEDR used to display the charge state is turned ON or OFF, for example. The full-charge detection circuit 62 determines that the battery 94 is in a full-charge state (charging has been completed) when the light-emitting device LEDR has been turned OFF for a given period of time (e.g., five seconds). The charge control device 92 of the load 90 also detects the full-charge state based on the ON/OFF state of the light-emitting device LEDR.

The load 90 includes the charge control device 92 which controls charging the battery 94 and the like. The charge control device 92 detects the full-charge state based on the ON/OFF state of the light-emitting device (LEDR). The charge control device 92 (charge control IC) may be implemented by an integrated circuit device or the like. The battery 94 may be provided with the function of the charge control device 92 (e.g., smart battery). Note that the load 90 is not limited to a secondary battery.

Operation During Authentication

Figure 4A:
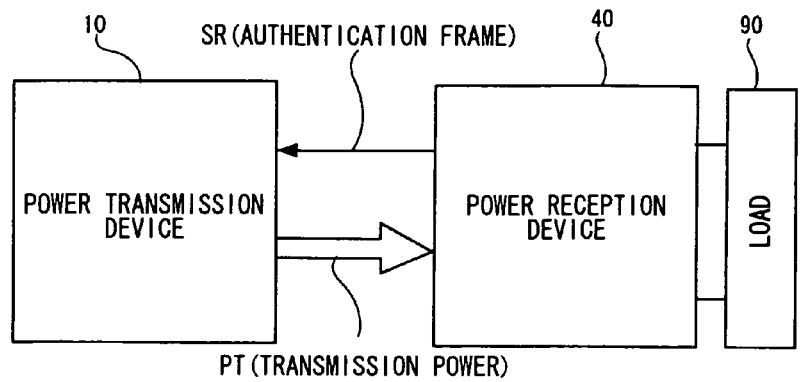
FIGS. 4A to 4C are views illustrative of an example of an authentication operation and a maximum transmission power regulation operation.
Figure 4B:
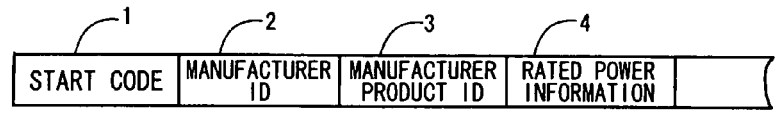
Figure 4C:

An authentication operation before normal power transmission and a maximum transmission power regulation operation are described below. FIGS. 4A to 4C are views illustrative of an example of the authentication operation and the maximum transmission power regulation operation. FIG. 4A is a view showing a state in which the maximum transmission power is regulated based on authentication information, and FIGS. 4B and 4C are views showing specific examples of the authentication information.

As shown in FIG. 4A, the power reception device 40 transmits an authentication frame (SR) to the power transmission device 10. The authentication frame (SR) is transmitted by means of load modulation performed by the load modulation section 46.

The term "authentication information" refers to "information transmitted from the power reception device 40 to the power transmission device 10 during authentication". The authentication frame (SR) falls under the term "authentication information". As shown in FIGS. 4B and 4C, the authentication frame (SR) includes a start code 1, a manufacturer ID 2, and a manufacturer product ID 3.

The manufacturer ID 2 is information which specifies the manufacturer of the power-reception-device-side instrument (at least one of the power reception device and the electronic instrument). The manufacturer product ID 3 is information (e.g., code which indicates the type or model number of the product) which specifies the power-reception-device-side instrument (at least one of the power reception device and the electronic instrument). The power transmission device 10 can specify the manufacturer and the type of the power-reception-device-side instrument 40. If the power-reception-device-side instrument 40 can be specified, the power transmission device 10 can determine (i.e., authenticate) whether or not the power-reception-device-side instrument 40 can be the normal power transmission target.

In FIG. 4B, the authentication frame (SR) further includes rated power information 4. The rated power information 4 is information which indicates the rated power of the power-reception-device-side instrument (at least one of the power reception device and the electronic instrument). When the power transmission device 10 accepts normal power transmission as a result of the authentication process, the power transmission device 10 regulates the maximum transmission power during normal power transmission to conform to the rated power (generally regulates the maximum transmission power to the rated power value) based on the rated power information 4.

In FIG. 4C, the authentication frame (SR) includes resonance characteristic information 5 instead of the rated power information. The term "resonance characteristic information" refers to information relating to the resonance frequency used or information relating to the inductance of an LC resonant circuit or the capacitance of a capacitor. The power transmission device 10 can achieve the resonance characteristics of a resonant circuit desired by the power reception device 40 based on the resonance characteristic information 5, and perform power transmission under optimum conditions.

In FIG. 4A, PT indicates transmission power of which the maximum transmission power is controlled by the power transmission device 10. Since the rated power information 4 or the resonance characteristic information 5 is included in the authentication frame (SR) shown in FIG. 4B or 4C, the power transmission device 10 can directly obtain information necessary for achieving optimum maximum transmission power. Therefore, transmission power can be easily controlled.

Figure 5A:
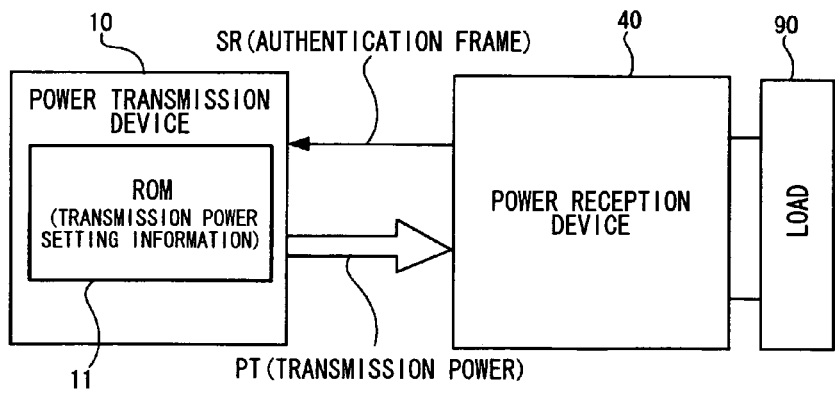
FIGS. 5A and 5B are views illustrative of another example of an authentication operation and a maximum transmission power regulation operation.
Figure 5B:
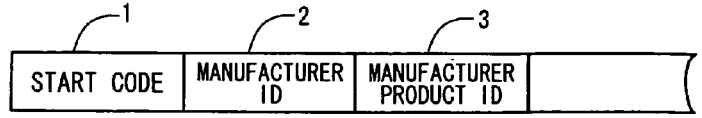

FIGS. 5A and 5B are views illustrative of another example of the authentication operation and the maximum transmission power regulation operation. FIG. 5A is a view showing a state in which the maximum transmission power is regulated based on the authentication information, and FIG. 5B is a view showing a specific example of the authentication information.

As shown in FIG. 5A, the power transmission device 10 includes a memory (ROM) 11 which stores transmission power setting information 11. The transmission power setting information 11 is table information which associates the power-reception-device-side instrument 40 with the rated power information, for example.

The authentication frame (SR) shown in FIG. 5B includes the start code 1, the manufacturer ID 2, and the manufacturer product ID 3, but does not include the rated power information 4 and the resonance characteristic information 5 shown in FIGS. 4B and 4C. Specifically, the power reception device 10 can merely specify the power-reception-device-side instrument 40, but cannot directly acquire the information for regulating the transmission power. Therefore, the power transmission device 10 acquires the rated power information relating to the power-reception-device-side instrument 40 using the transmission power setting information 11 stored in the memory (ROM) 11 (e.g., table information which associates the power-reception-device-side instrument 40 with the rated power information), and optimize the maximum transmission power based on the transmission power setting information.

Method of Controlling Maximum Transmission Power by Changing Transmission Frequency or Transmission Level An example of transmission power control is described below. The following description focuses on a method of controlling the maximum transmission power by changing the transmission frequency or the transmission level.

Figure 6:
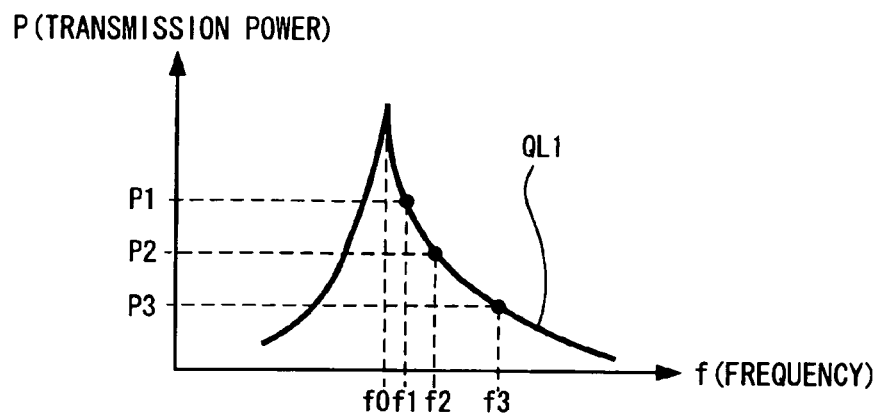
FIG. 6 is a view showing the relationship between a transmission frequency and transmission power.

FIG. 6 is a view showing the relationship between the transmission frequency and the transmission power. A characteristic line QL1 in FIG. 6 indicates the resonance characteristics of an LC resonant circuit which includes the primary coil (L1) and the capacitor included in the power transmission section 12. As shown in FIG. 6, the transmission power is uniquely determined by specifying the transmission frequency.

A frequency f0 is the resonance frequency. The transmission power is maximized at the frequency f0. However, a state near the resonance point slightly changes and may pose a problem relating to safety. Therefore, the frequency f0 is not use during actual power transmission. The transmission power value is P1 at a transmission frequency f1 (i.e., high transmission power). The transmission power value is P2 at a transmission frequency f2 (i.e., medium transmission power). The transmission power value is P3 at a transmission frequency f3 (i.e., low transmission power).

Figure 7:
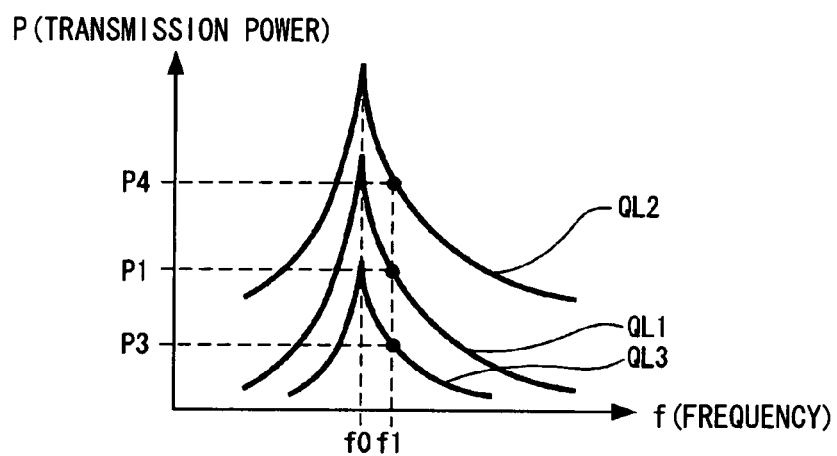
FIG. 7 is a view showing an example in which transmission power is changed by changing resonance characteristics without changing the resonance frequency of a resonant circuit.

FIG. 7 is a view showing an example in which the transmission power is changed by changing the resonance characteristics without changing the resonance frequency of the resonant circuit. In FIG. 7, QL1, QL2, and QL3 indicate different resonance characteristics of the resonant circuit. The resonance frequency is constant (f0). The resonance characteristics QL1 to QL3 shown in FIG. 7 have an identical shape of the resonance curve, but differ in level (i.e., the level of the voltage supplied to the resonant circuit).

In FIG. 7, even if the transmission frequency is constant (f1), the transmission power value changes in the order of P3 (low level), P1 (medium level), and P4 (high level). when changing the resonance characteristic in the order of QL3, QL1, and QL2.

Figure 8:
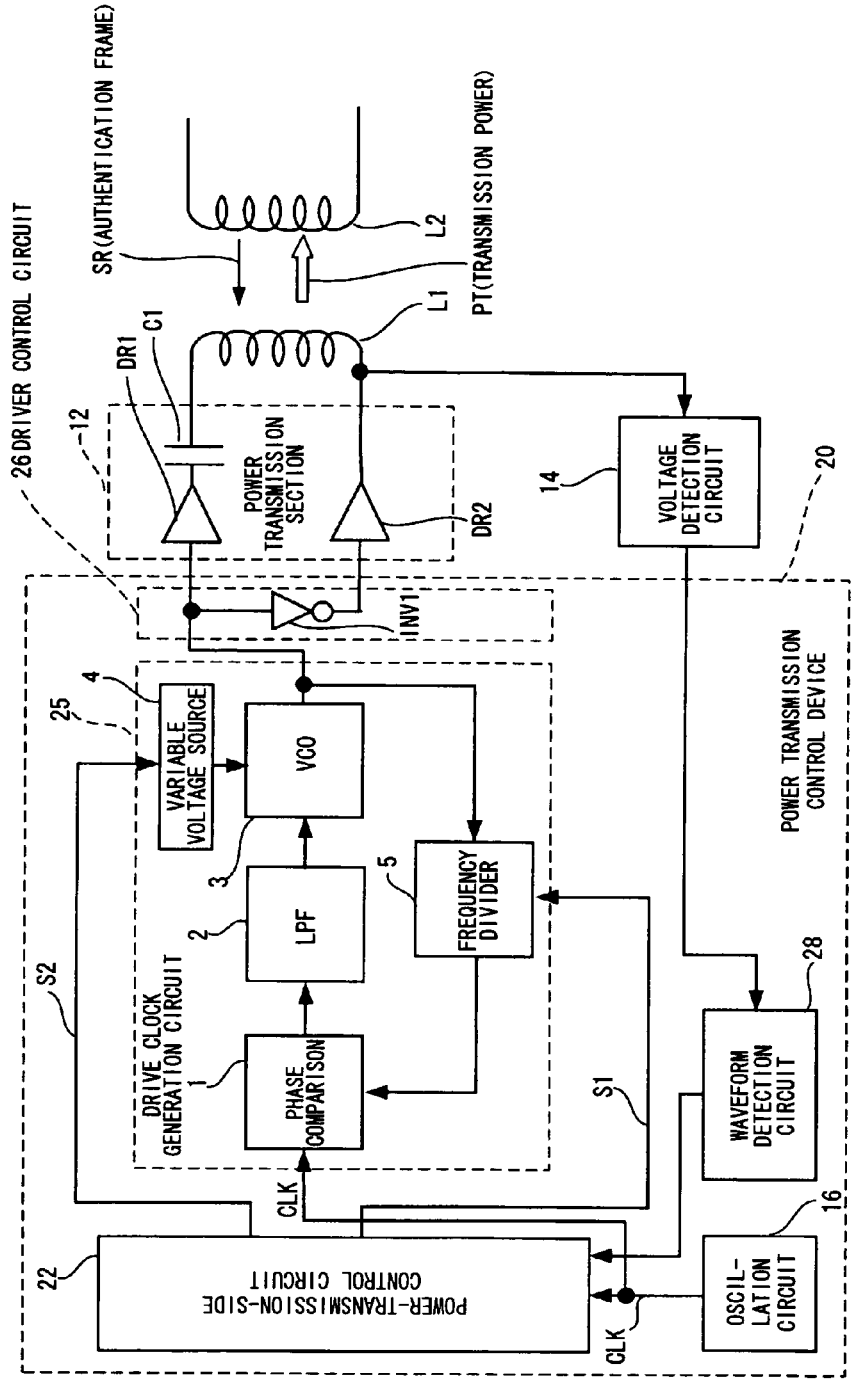
FIG. 8 is a circuit diagram showing an example of the main circuit configuration of a power transmission device which can change a transmission frequency or a transmission level.

Therefore, the transmission power value can be appropriately changed using the method shown in FIG. 6 or 7. FIG. 8 is a circuit diagram showing an example of the main circuit configuration of a power transmission device which can change the transmission frequency or the transmission level. In FIG. 8, the same sections as in the above-mentioned drawings are indicated by the same reference numerals.

In FIG. 8, the power transmission control device 20 includes a drive clock signal generation circuit 25 which includes a PLL synthesizer oscillator, and the driver control circuit 26 which includes an inverter INV1. The driver control circuit also includes a preamplifier, a control circuit which prevents a shoot-through current which occurs when two power transmission drivers (DR1 and DR2) are simultaneously turned ON, and the like in addition to the inverter INV1.

The power transmission section 12 includes power transmission drivers (DR1 and DR2) and a capacitor (C1). The capacitor (C1) forms a series resonant circuit together with the primary coil L1.

The drive clock signal generation circuit 25 includes a phase comparator 1, a low-pass filter (LPF) 2 as an error integrator, a voltage-controlled oscillator (VCO) 3, a variable voltage source 4, and a variable frequency divider 5. A clock signal CLK from the oscillation circuit 16 is supplied to the phase comparator 1.

The power-transmission-side control circuit 22 changes the dividing ratio of the variable frequency divider 5 based on the information contained in the authentication frame (SR) transmitted from the power reception device 40 to control the frequency of the drive clock signal output from the drive clock signal generation circuit 25, thereby regulating the maximum transmission power to conform to the power rating of the power reception device 40.

The power-transmission-side control circuit 22 may regulate the level of the power supply voltage supplied to the VCO 3 by controlling the variable voltage source 4 to regulate the voltage amplitude of the drive clock signal, and may change the level of the resonance characteristics as shown in FIG. 7 to regulate the maximum transmission power.

Figure 9:
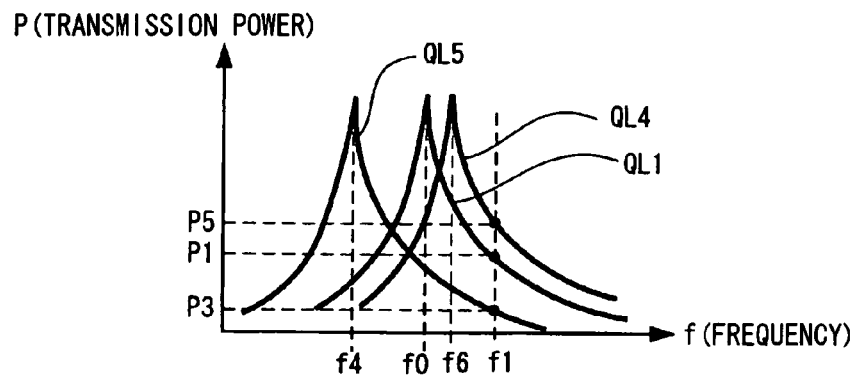
FIG. 9 is a view showing an example in which a different amount of power is transmitted at the same transmission frequency by selectively using a plurality of resonance characteristics which differ in resonance frequency.

Method of Increasing or Decreasing Maximum Transmission Power by Changing Resonance Frequency without Changing Transmission Frequency A method of increasing or decreasing the transmission power by changing the resonance frequency without changing the transmission frequency is described below. FIG. 9 is a view showing an example in which a different amount of power is transmitted at the same transmission frequency by selectively using a plurality of resonance characteristics which differ in resonance frequency.

In FIG. 9, QL1, QL4, and QL5 indicate the resonance characteristics of an LC resonant circuit including the primary coil (e.g., L1) and the capacitor (e.g., C1). The resonance characteristics QL1, QL4, and QL5 differ in resonance frequency. The resonance frequency of the resonance characteristics QL1 is the frequency f0, the resonance frequency of the resonance characteristics QL4 is a frequency f6, and the resonance frequency of the resonance characteristics QL5 is a frequency f4.

The resonance characteristics QL1, QL4, and QL5 are achieved by changing the coil inductance of the LC resonant circuit or the capacitance of the capacitor. As is clear from FIG. 9, the relative positional relationship (distance from the resonance frequency) with respect to the resonance frequency changes, even if the transmission frequency is f1, by changing (moving) the resonance frequency of the LC resonant circuit, whereby the transmission power can be changed. Specifically, the transmission power value can be changed in the order of P5, P1, and P3 by changing the resonance characteristics in the order of QL4, QL1, and QL5. The method of increasing or decreasing the transmission power without changing the transmission frequency does not cause a problem relating to radiation of electromagnetic waves (i.e., problem relating to the Radio Law) and is useful as a transmission power regulation method.

As the method of changing (moving) the resonance frequency of the resonant circuit, a method which changes at least one of the capacitance of the capacitor and the coil inductance of the LC resonant circuit may be considered.

Figure 10:
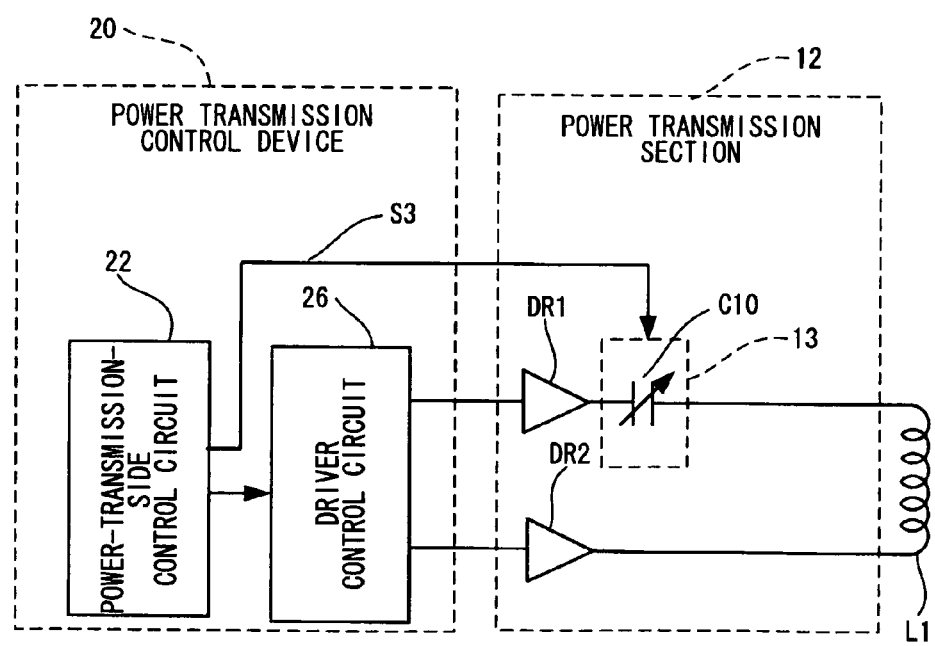
FIG. 10 is a circuit diagram showing the configuration of the main portion of a power transmission device which can regulate transmission power by changing the resonance characteristics of a resonant circuit by changing the capacitance of a capacitor of the resonant circuit.

FIG. 10 is a circuit diagram showing the configuration of the main portion of a power transmission device which can regulate the transmission power by changing the resonance characteristics of the resonant circuit by changing the capacitance of the capacitor of the resonant circuit. As shown in FIG. 10, the power transmission section 12 include a variable capacitor section 13. The variable capacitor section 13 includes a capacitor C10. The capacitance of the capacitor C10 is controlled using a capacitance control signal S3 from the power-transmission-side control circuit 22.

The capacitance of the capacitor C10 may be changed by providing a plurality of auxiliary capacitors in advance, and individually controlling connection/disconnection of each auxiliary capacitor with respect to the primary coil (L1) using an analog switch to change the total capacitance.

Figure 11:
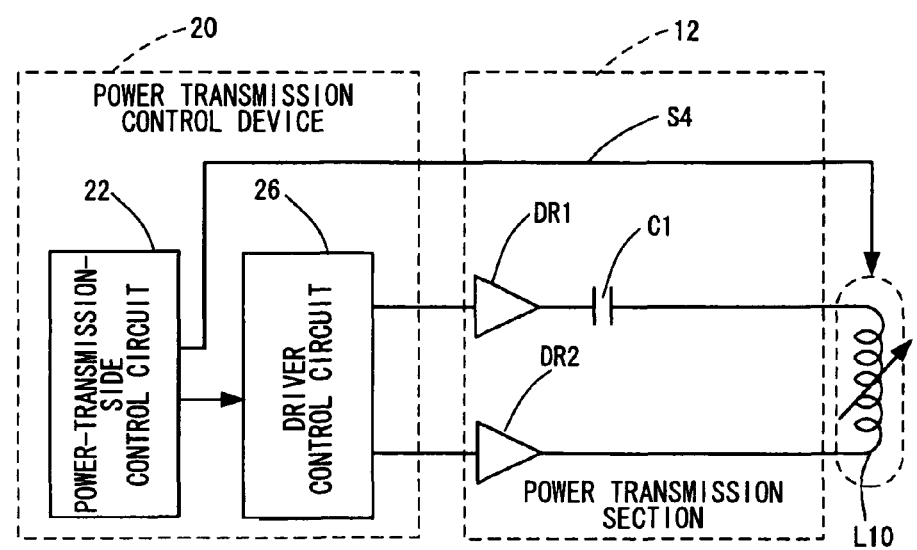
FIG. 11 is a circuit diagram showing the configuration of the main portion of a power transmission device which can regulate transmission power by changing the resonance characteristics of a resonant circuit by changing the coil inductance of the resonant circuit.

FIG. 11 is a circuit diagram showing the configuration of the main portion of a power transmission device which can regulate the transmission power by changing the resonance characteristics of the resonant circuit by changing the coil inductance of the resonant circuit. The primary coil (L10) is a coil of which the inductance is variable. The inductance of the primary coil (L10) is controlled using an inductance control signal S4 from the power-transmission-side control circuit 22.

The inductance of the primary coil (L10) may be changed by providing a plurality of auxiliary coils in advance, and individually controlling connection/disconnection of each auxiliary capacitor with respect to the primary coil (main coil) using an analog switch to change the total inductance.

Application of Power-Saving Power Transmission

A case of applying the function of controlling the transmission power without changing the power transmission frequency to power-saving power transmission is described below. The term "power-saving power transmission" refers to continuous power transmission which transmits a small amount of power as compared with normal power transmission.

For example, when power transmission from the power transmission device 10 is completely stopped after the load 90 (secondary battery 94) of the power reception device 40 has been completed, it is impossible to recharge the load 90 (secondary battery 94). Specifically, when the portable instrument or the like is continuously placed on the charger, for example, the load 90 (secondary battery 94) which has been fully charged is discharged and requires recharging with the passage of time. In this case, it is necessary to recharge the load 90 (secondary battery 94). On the other hand, when normal power transmission is stopped when the load 90 (secondary battery 94) has been fully charged, the power reception device cannot detect that recharging is necessary.

Therefore, continuous power transmission (i.e., power-saving power transmission) which transmits a small amount of power is performed after the load 90 (secondary battery 94) has been fully charged to maintain the charge control device 92 (see FIG. 2) of the load 90 of the power reception device 40 in an operating state.

Specifically, a minimum amount of power necessary for managing the charge state of the secondary battery 94 is constantly transmitted, and the charge control device 92 detects whether or not recharging is necessary, and immediately starts recharging when recharging is necessary. Since this causes a large amount of load current to flow, the load with respect to the power reception device 10 increases, whereby the voltage at the end of the primary coil (L1) increases. The voltage detection circuit 14 and the waveform detection circuit 28 (see FIG. 2) detect the increase in voltage. When the power-transmission-side control circuit 22 included in the power transmission control device 20 has detected that the load of the power reception device 40 has suddenly increased during power-saving power transmission, the power-transmission-side control circuit 22 determines that recharging has started and changes power transmission from power-saving power transmission to normal power transmission. This enables the secondary battery 94 included in the load 90 of the power reception device 40 to be easily recharged.

When the transmission frequency is changed when a transition from normal power transmission to power-saving power transmission or a transition from power-saving power transmission to normal power transmission occurs, undesirable radiation noise may occur. Therefore, measures relating to the Radio Law are required.

Specifically, it is desirable to change power transmission between normal power transmission and power-saving power transmission by increasing or decreasing the transmission power without changing the transmission frequency. Therefore, a method is employed which controls the transmission power by changing the characteristics of the resonant circuit.

Specifically, power transmission is changed between normal power transmission and power-saving power transmission by increasing or decreasing the transmission power by changing (moving) the resonance frequency of the LC resonant, as shown in FIG. 9. When using the method shown in FIG. 9, the relative positional relationship (distance from the resonance frequency) of the transmission frequency f1 with respect to the resonance frequency changes, whereby the transmission power can be changed. Specifically, the transmission power value can be changed in the order of P5, P1, and P3 by changing the resonance characteristics in the order of QL4, QL1, and QL5. For example, P1 shown in FIG. 9 is the transmission power value during normal power transmission, and P3 is the transmission power value during power-saving power transmission.

The method of implementing power-saving power transmission by increasing or decreasing the transmission power without changing the transmission frequency does not cause a problem relating to radiation of electromagnetic waves (i.e., problem relating to the Radio Law) and is useful as a transmission power regulation method.

Example of Specific Operation of Non-Contact Power Transmission System

Figure 12:
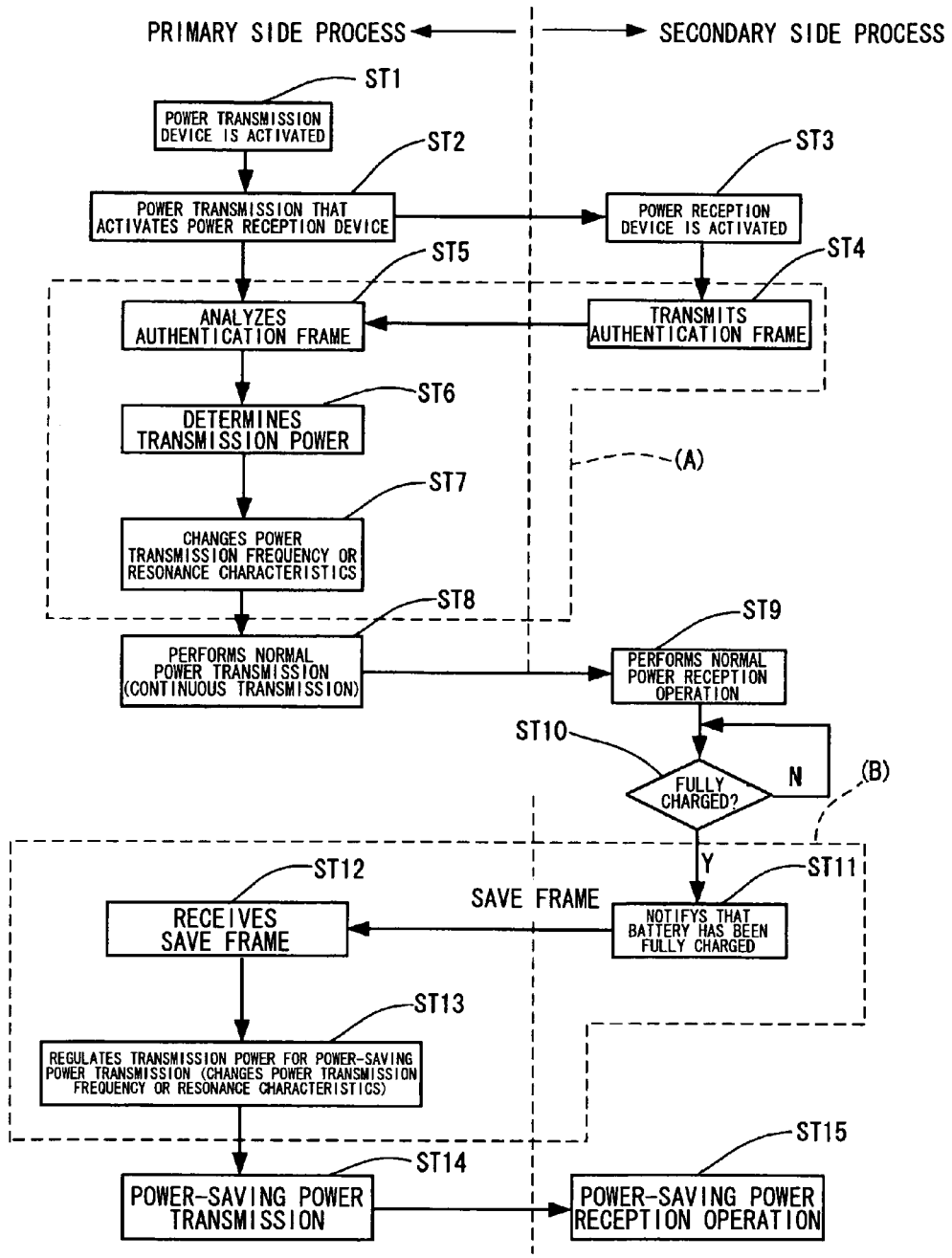
FIG. 12 is a flowchart showing an example of a specific operation of a non-contact power transmission system according to the invention.

FIG. 12 is a flowchart showing an example of a specific operation of the non-contact power transmission system according to the invention. In FIG. 12, the left side shows a process of the primary-side instrument (i.e., power reception device), and the right side shows a process of the secondary-side instrument (i.e., power transmission device).

The power transmission device 10 is activated (step ST1). The power transmission device 10 starts power transmission (e.g., intermittent power transmission) to activate the power reception device 40 (step ST2).

The power reception device 40 is activated due to the supply of power (step ST3). The power reception device 40 transmits the authentication frame (authentication information) to the power transmission device 10 by means of load modulation (step ST4).

The power transmission device 10 detects a change in the voltage at the end of the primary coil (L1) using the voltage detection circuit 14 and the waveform detection circuit 28 to detect a change in the load of the power reception device. The power transmission device 10 thus receives the authentication frame, and analyzes the received authentication frame (step ST5).

The power transmission device 10 specifies the power-reception-device-side instrument 40 (power reception device and electronic instrument) by analyzing the authentication frame. The power transmission device 10 also specifies the rated power and determines the power transmission power (i.e., maximum transmission power) to conform to the rated power (step ST6).

The power transmission device 10 changes the power transmission frequency (FIG. 6) or changes the resonance characteristics (FIG. 7 or 9) in order to achieve the determined power transmission power (maximum transmission power) (step ST7). The power transmission device 10 then starts normal power transmission (continuous power transmission based on the determined power value) (step ST8).

In FIG. 12, the steps ST5 to ST7 make up a process (A) which controls the transmission power utilizing the authentication process.

The power reception device 40 performs normal power reception process (e.g., rectification process and supplying power the load 90) (step ST9). The power reception device 40 monitors the state of the load 90, and detects whether the load 90 requires normal power transmission. For example, the charge control device 92 included in the load 90 monitors the charge state of the secondary battery 94, and detects whether or not the secondary battery 94 has been fully charged (step ST10).

When the power reception device 40 has detected that the secondary battery 94 has been fully charged, the power reception device 40 transmits a save frame to the power transmission device 10 by means of load modulation performed by the load modulation section 46 to notify the power transmission device 10 that the secondary battery 94 has been fully charged (step ST11). When the power transmission device 10 has received the save frame (step ST12), the power transmission device 10 performs a process which changes power transmission from normal power transmission to power-saving power transmission.

Specifically, the power transmission device 10 regulates the transmission power to the power-saving transmission power while maintaining the transmission frequency at a frequency during normal power transmission by reducing the power transmission frequency or changing the resonance characteristics to increase the distance from the resonance frequency (resonance peak), for example (step ST13).

The power transmission device 10 then performs power-saving power transmission (step ST14). The power reception device 40 performs a power-saving power reception operation (i.e., operation which supplies a minimum amount of power which can maintain the rectification operation and the operation of monitoring the charge state of the load 90) (step ST15).

The steps ST11 to ST13 make up a process (B) which implements power-saving power transmission by reducing the transmission power without changing the transmission frequency.

According to the invention, it is possible to deal with various power-reception-device-side instruments using one power transmission device. Moreover, applications in which power-saving power transmission is performed without changing the transmission frequency become possible. Therefore, convenience of the wireless point power transmission system can be improved to a large extent.

According to some embodiments of the invention, the following effects can be obtained, for example. Note that the following effects are not necessarily achieved at the same time. Accordingly, the following effects do not in any way limit the scope of the invention.

(1) The power reception device can acquire the power-reception-device-side information and determine whether or not the power reception device can perform power transmission by the authentication process. Moreover, the maximum transmission power can be regulated using the authentication information. This makes it possible to deal with a wide range of power-reception-device-side instruments using a single power reception device.

(2) It is unnecessary to provide a power transmission device for each power reception device, whereby a primary-side instrument and a secondary-side instrument can be flexibly combined.

(3) Since an excessive power is not transmitted to the power-reception-device-side instrument, safety of the power-reception-device-side instrument is ensured.

(4) Since an excessive power is not transmitted to the power-reception-device-side instrument, the rating (voltage rating or current rating) of the power-reception-device-side component can be reduced, whereby cost can be reduced.

(5) Since the authentication information (the authentication information may include the rated power information, the resonance characteristic information, or the identification which specifies the power-reception-side instrument) is effectively utilized, information used to determine the maximum transmission power need not be transmitted from the power reception device to the power transmission device, whereby the communication process can be simplified.

(6) The transmission power can controlled with high accuracy by employing a method which changes the transmission frequency or the transmission amplitude.

(7) The transmission power can be increased or decreased by changing the resonance characteristics of the LC resonant circuit without changing the transmission frequency. Since the transmission frequency is constant, a problem relating to undesirable radiation noise of electromagnetic waves or a problem relating to the Radio Law due to a change in frequency does not occur.

(8) Power-saving power transmission can be implemented without changing the transmission frequency by applying the technology which reduces the transmission power by changing the resonance characteristics of the LC resonant circuit to power-saving power transmission. This implements power-saving power transmission without causing a problem due to a change in frequency (problem relating to undesirable radiation noise of electromagnetic waves or problem relating to the Radio Law). Therefore, secondary battery recharge management can be easily performed.

(9) The power transmission power of a single power transmission device can be flexibly regulated to conform to the rated power of the power-reception-device-side instrument. Therefore, it is possible to flexibly deal with a wide range of electronic instruments. Moreover, various electronic instruments provided with the power reception device can safely utilize a single power-transmission-side electronic instrument.

(10) Convenience of the non-contact power transmission system is improved to a large extent. Therefore, utilization of the non-contact power transmission system can be promoted.

(11) The non-contact power transmission system can be widely spread as a social infrastructure.

Although only some embodiments of the invention have been described in detail above, those skilled in the art would readily appreciate that many modifications are possible in the embodiments without materially departing from the novel teachings and advantages of the invention. Specifically, many modifications are possible in the embodiments without materially departing from the novel teachings and advantages of the invention.

Accordingly, such modifications are intended to be included within the scope of the invention. Any term (e.g., GND and portable telephone/charger) cited with a different term (e.g., low-potential-side power supply and electronic instrument) having a broader meaning or the same meaning at least once in the specification and the drawings can be replaced by the different term in any place in the specification and the drawings. Any combinations of the embodiments and the modifications are also included within the scope of the invention.

The configurations and the operations of the power transmission control device, the power transmission device, the power reception control device, and the power reception device and the method of detecting the secondary-side load by the primary side are not limited to those described in the above embodiments. Various modifications and variations may be made.

Some embodiments of the invention contribute to enhancement of utilization of the non-contact power transmission system by enabling various electronic instruments provided with the power reception device to safely utilize a single power-transmission-side electronic instrument. Therefore, the invention may be utilized for a power transmission control device (power transmission control IC), a power reception control device (power reception control IC), a non-contact power transmission system, a power transmission device (e.g., IC module), a power reception device (e.g., IC module), an electronic instrument (e.g., portable terminal or charger), and the like. Note that the term "portable terminal" includes a portable telephone terminal, a PDA terminal, and a portable computer terminal.

What is claimed is:

1. A non-contact power transmission system comprising a power transmission device and a power reception device, the non-contact power transmission system transmitting power from the power transmission device to the power reception device by electromagnetically coupling a primary coil and a secondary coil to transmit the power to a load of the power reception device, the power reception control device including:
  a load modulation section that is used to transmit a signal to the power transmission device; and
  a power-reception-side control circuit that controls the power reception device;
  the power-reception-side control circuit performing control of transmitting authentication information to the power transmission device by load modulation by controlling an operation of the load modulation section during authentication before normal power transmission is started, the authentication information including information that allows the power reception device to control transmission power during the normal power transmission;
a power-transmission-side control circuit of the power transmission device performing an authentication process based the authentication information that is transmitted from the power reception device to determine whether or not power transmission can be performed before the normal power transmission is started, the power-transmission-side control circuit performing control of the normal power transmission when the power-transmission-side control circuit has determined that power transmission can be performed, and controlling maximum transmission power during the normal power transmission to conform to a rated power of a power-reception-device-side based on the information that is included in the authentication information and allows the power transmission device to control transmission power during the normal power transmission.

2. The non-contact power transmission system as defined in claim 1, the power-reception-side control circuit monitoring a state of the load during the normal power transmission, and performing control of transmitting a signal that requests power-saving power transmission when the load does not require the power transmission during the normal power transmission, at the power-saving transmission, the power transmission device transmitting the power smaller than the power at the normal power transmission; and the power-transmission-side control circuit performing control of changing resonance characteristics of the resonant circuit when receiving the signal that requests the power-saving power transmission from the power reception device, and performing control of the power-saving power transmission at the same frequency as a frequency during power transmission.

3. The non-contact power transmission system as defined in claim 1,
the power transmission device including a resonant circuit that includes the primary coil, and a capacitor that is connected to the primary coil; and
the power-transmission-side control circuit controlling maximum transmission power during the normal power transmission by changing resonance characteristics of the resonant circuit.

4. A power transmission control device provided in a power transmission device of a non-contact power transmission system, the non-contact power transmission system transmitting power from the power transmission device to a power reception device by electromagnetically coupling a primary coil and a secondary coil to transmit the power to a load of the power reception device, the power transmission control device comprising:
a power-transmission-side control circuit that controls the power transmission device including a resonant circuit that includes the primary coil, and a capacitor that is connected to the primary coil,
the power-transmission-side control circuit performing an authentication process based on authentication information that is transmitted from the power reception device to determine whether or not power transmission can be performed before normal power transmission is started, the power-transmission-side control circuit performing control of the normal power transmission when the power-transmission-side control circuit has determined that power transmission can be performed, and controlling maximum transmission power during the normal power transmission to conform to a rated power of power-reception-device-side by changing resonance characteristics of the resonant circuit based on at least part of the authentication information.

5. The non-contact power transmission system as defined in claim 4,
capacitance of the capacitor being variable; and
the power-transmission-side control circuit adjusting the capacitance of the capacitor to control the maximum transmission power during the normal power transmission by using a capacitance adjustment signal.

6. The non-contact power transmission system as defined in claim 4,
the primary coil being a coil that has a variable inductance; and
the power-transmission-side control circuit changing resonance characteristics of the resonant circuit by adjusting the inductance of the primary coil using an inductance adjustment signal to control the maximum transmission power during the normal power transmission.

7. The non-contact power transmission system as defined in claim 4,
the power-transmission-side control circuit changing the resonance characteristics of the resonant circuit when receiving a signal that requests power-saving power transmission from the power reception device, at the power-saving power transmission, the power transmission device transmitting the power smaller than the power at the normal power transmission, and the power-transmission-side control circuit performing control of the power-saving power transmission at the same frequency as a frequency during the normal power transmission.

8. The transmission control device as defined in claim 4, the authentication information including rated power information of power-reception-device-side, and the power-transmission-side control circuit controlling the maximum transmission power during the normal power transmission based on the rated power information of power-reception-device-side.

9. The power transmission control device as defined in claim 4,
the authentication information including information relating to resonance characteristics of the resonant circuit.

10. The power transmission control device as defined in claim 4,
the authentication information including information that specifies a power-reception-device-side instrument.

11. A power transmission device comprising:
the power transmission control device as defined in claim 4;
a power transmission driver that drives the primary coil;
a drive clock signal generation circuit that generates a drive clock signal; and
a driver control circuit that controls the power transmission driver based on the drive clock signal.

12. An electronic instrument comprising the power transmission device as defined in claim 11.

* * * * *